United States Patent
Khan et al.

(10) Patent No.: US 11,086,556 B2
(45) Date of Patent: Aug. 10, 2021

(54) SYSTEM AND METHOD FOR OVERPROTECTION MITIGATION

(71) Applicant: EMC IP Holding Company LLC, Hopkinton, MA (US)

(72) Inventors: Asif Khan, Bangalore (IN); Amith Ramachandran, Bangalore (IN); Amarendra Behera, Bangalore (IN); Deepika Nagabushanam, Bengaluru (IN); Ashish Kumar, Bangalore (IN); Pati Mohan, Bangalore (IN); Tushar Dethe, Bangalore (IN); Himanshu Arora, Bangalore (IN); Gururaj Soma, Bangalore (IN); Sapna Chauhan, Bangalore (IN); Soumen Acharya, Bangalore (IN); Reshmee Jawed, Bengaluru (IN); Shelesh Chopra, Bangalore (IN); Yasemin Ugur-Ozekinci, Oakville (CA); Navneet Upadhyay, Ghaziabad (IN); Shraddha Chunekar, Indore (IN); Deepak Anantha Bellare Mallya, Bengaluru (IN); Arun Chakravarthy, Bengaluru (IN); Kanagasabapathy Venkatachalam, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 61 days.

(21) Appl. No.: 16/672,313

(22) Filed: Nov. 1, 2019

(65) Prior Publication Data

US 2021/0132809 A1     May 6, 2021

(51) Int. Cl.
    *G06F 3/06*       (2006.01)
    *G06F 16/11*    (2019.01)

(52) U.S. Cl.
    CPC ............ *G06F 3/065* (2013.01); *G06F 3/0604* (2013.01); *G06F 3/067* (2013.01); *G06F 3/0619* (2013.01); *G06F 16/125* (2019.01)

(58) Field of Classification Search
    CPC ...... G06F 3/065; G06F 3/0604; G06F 3/0619; G06F 3/067; G06F 16/125
(Continued)

(56) References Cited

U.S. PATENT DOCUMENTS

| | | |
|---|---|---|
| 6,745,210 B1 | 6/2004 | Scanlan et al. |
| 8,554,918 B1 | 10/2013 | Douglis |

(Continued)

*Primary Examiner* — Than Nguyen
(74) *Attorney, Agent, or Firm* — Chamberlain, Hrdlicka, White, Williams & Aughtry

(57) ABSTRACT

A backup storage for managing backups of clients includes persistent storage and a backup analyzer. The persistent storage includes the backups, protection policies, and an early deletion schedule. The backup analyzer obtains a request to analyze a protection policy of the protection policies; in response to obtaining the request: obtains backup data information associated with the protection policy; makes a determination, based on the backup data information and the protection policy, that a portion of the backups associated with the protection policies overprotect a client of the clients associated with the protection policy; and modifies the early deletion schedule based on the determination to obtain a modified early deletion schedule.

20 Claims, 9 Drawing Sheets

(58) Field of Classification Search
USPC .......................................................... 707/662
See application file for complete search history.

(56) References Cited

U.S. PATENT DOCUMENTS

| | | |
|---|---|---|
| 9,798,629 B1 | 10/2017 | Shilane et al. |
| 9,977,704 B1 | 5/2018 | Chopra et al. |
| 10,089,144 B1 | 10/2018 | Nagpal et al. |
| 10,102,080 B1 | 10/2018 | Gruszka et al. |
| 10,616,127 B1 | 4/2020 | Suit |
| 2007/0136541 A1 | 6/2007 | Herz et al. |
| 2009/0271485 A1 | 10/2009 | Sawyer |
| 2013/0085995 A1 | 4/2013 | Mostachetti et al. |
| 2014/0279912 A1 | 9/2014 | Anglin |
| 2015/0096011 A1 | 4/2015 | Watt |
| 2016/0306564 A1* | 10/2016 | Cheng ................. H04L 67/1008 |
| 2016/0342403 A1 | 11/2016 | Zamir |
| 2017/0010941 A1* | 1/2017 | Shimada ................. G06F 11/00 |
| 2017/0075765 A1 | 3/2017 | Chen |
| 2017/0132089 A1 | 5/2017 | Roehrsheim et al. |
| 2017/0357550 A1 | 12/2017 | Jain |
| 2017/0364415 A1 | 12/2017 | Formato et al. |
| 2018/0095816 A1 | 4/2018 | Fang et al. |
| 2018/0314457 A1* | 11/2018 | Bender ................. G06F 3/0634 |
| 2019/0278661 A1 | 9/2019 | Mehta et al. |
| 2019/0278663 A1* | 9/2019 | Mehta ..................... G06F 3/067 |
| 2020/0019319 A1* | 1/2020 | Cheng .................. G06F 3/0619 |
| 2020/0019470 A1* | 1/2020 | Wolfson ............. G06F 11/1461 |
| 2020/0264919 A1 | 8/2020 | Vukovic |
| 2020/0334199 A1 | 10/2020 | Wolfson et al. |
| 2020/0364112 A1* | 11/2020 | Mehta ................... G06F 3/0649 |
| 2020/0387321 A1* | 12/2020 | Bansal ................ G06F 11/1453 |

* cited by examiner

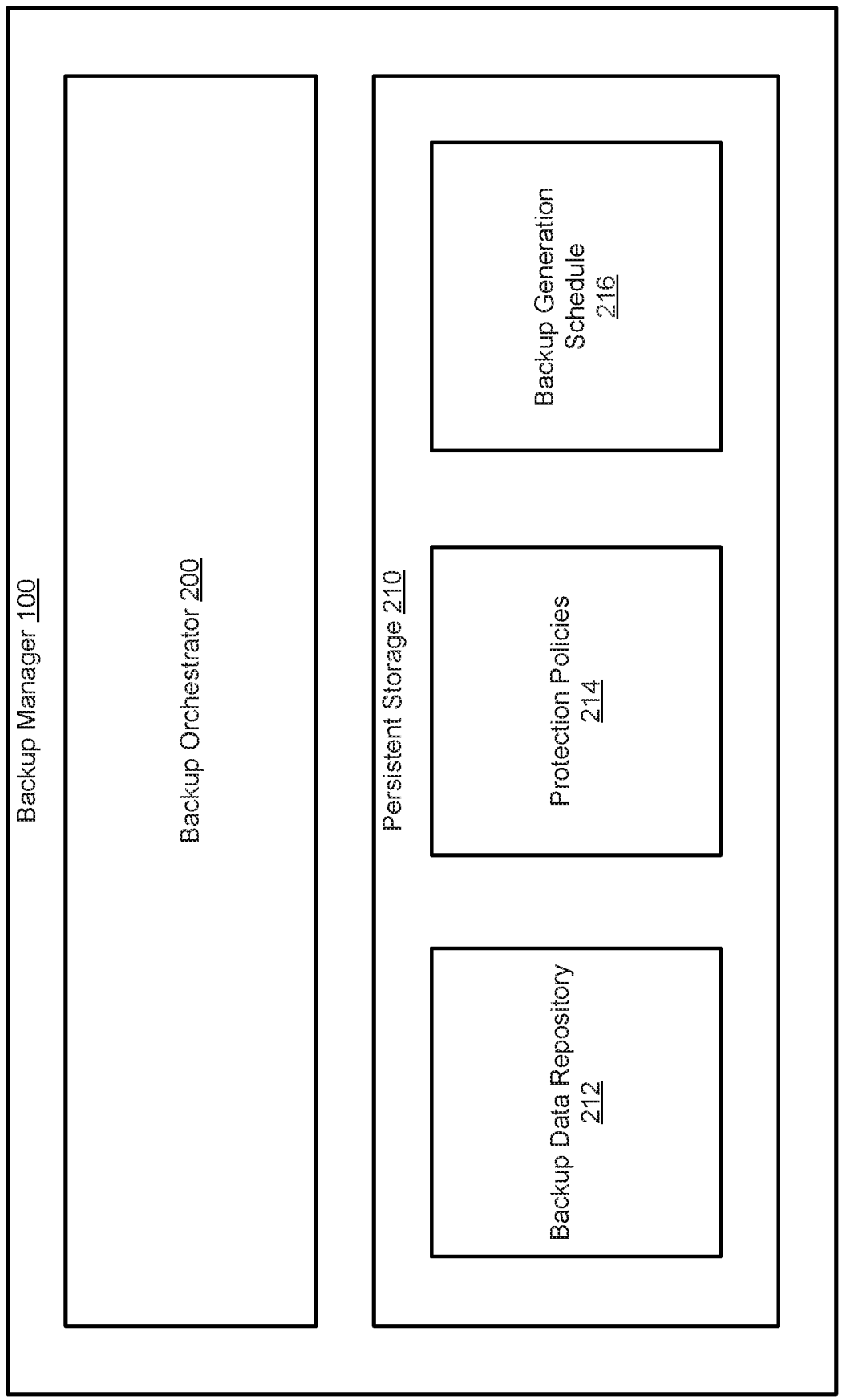
FIG. 2.1

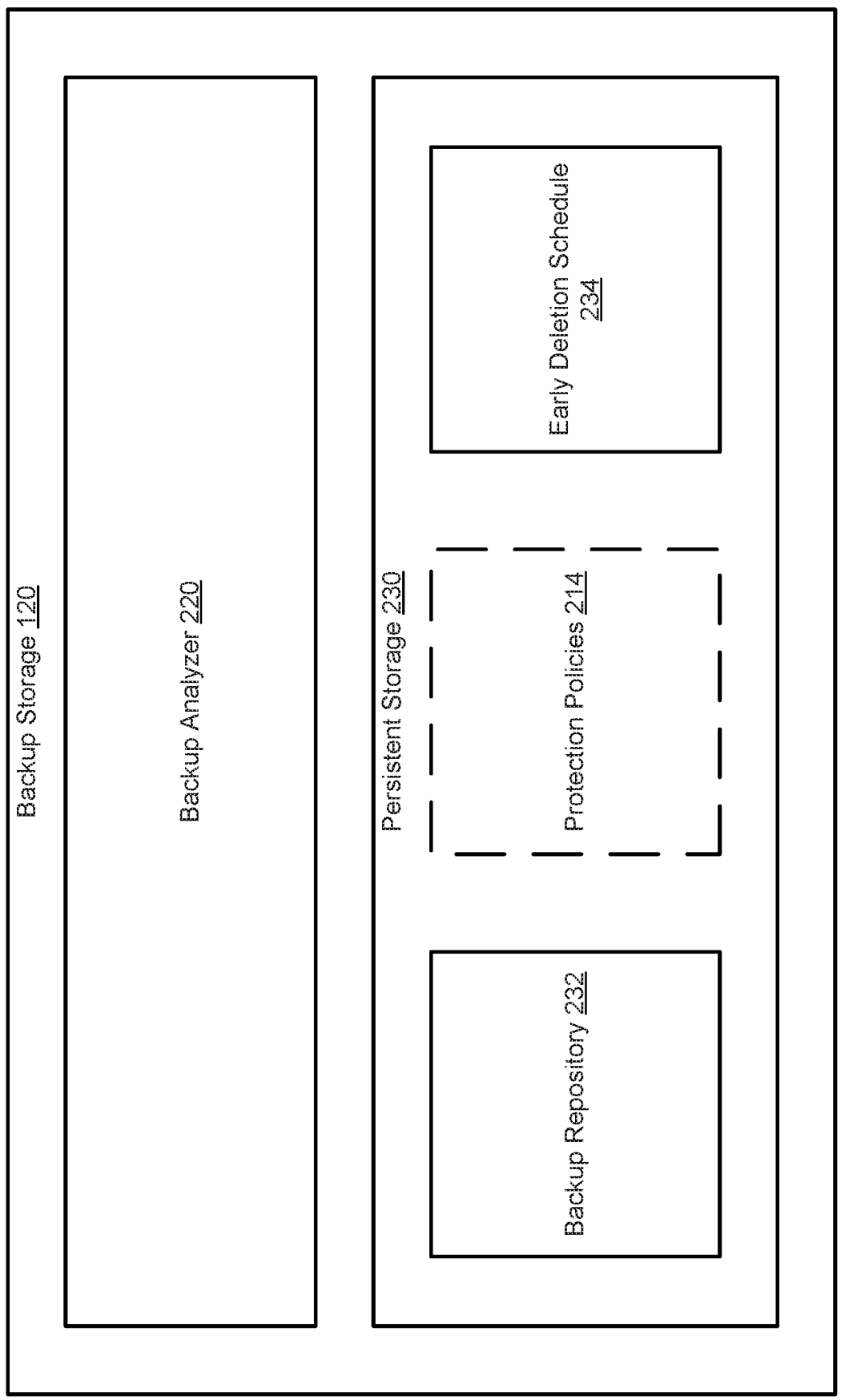
FIG. 2.2

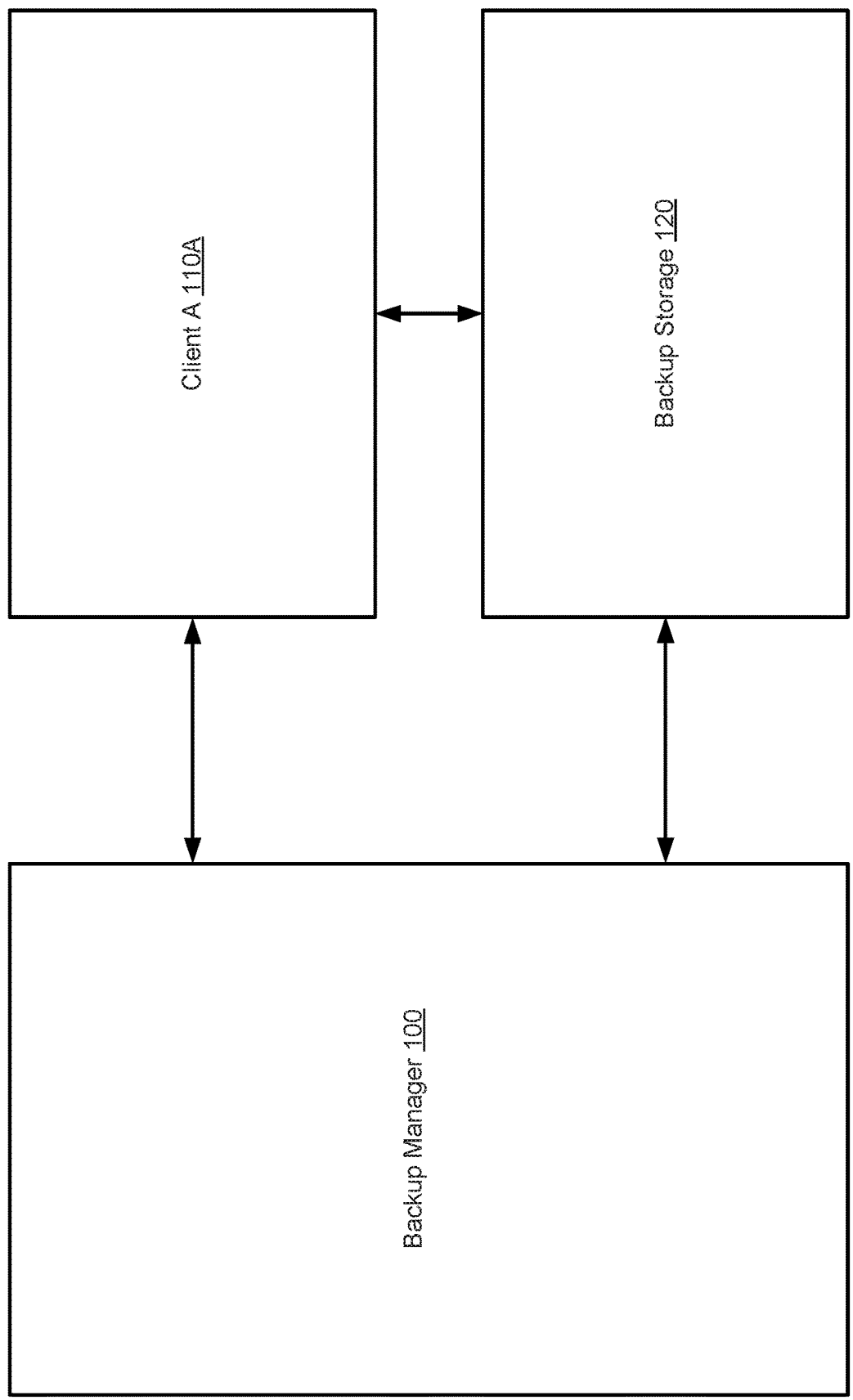
FIG. 5.1

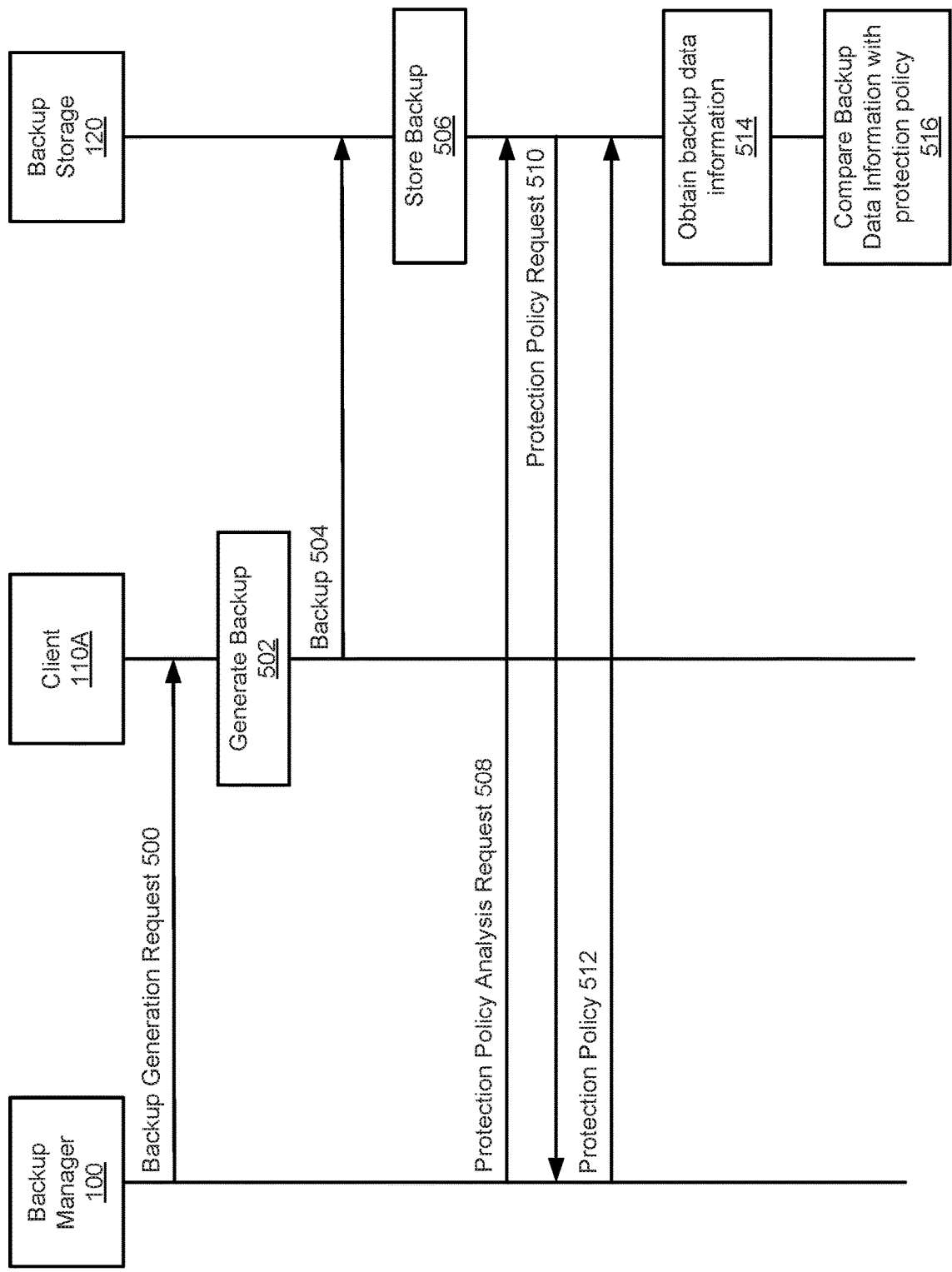
FIG. 5.2

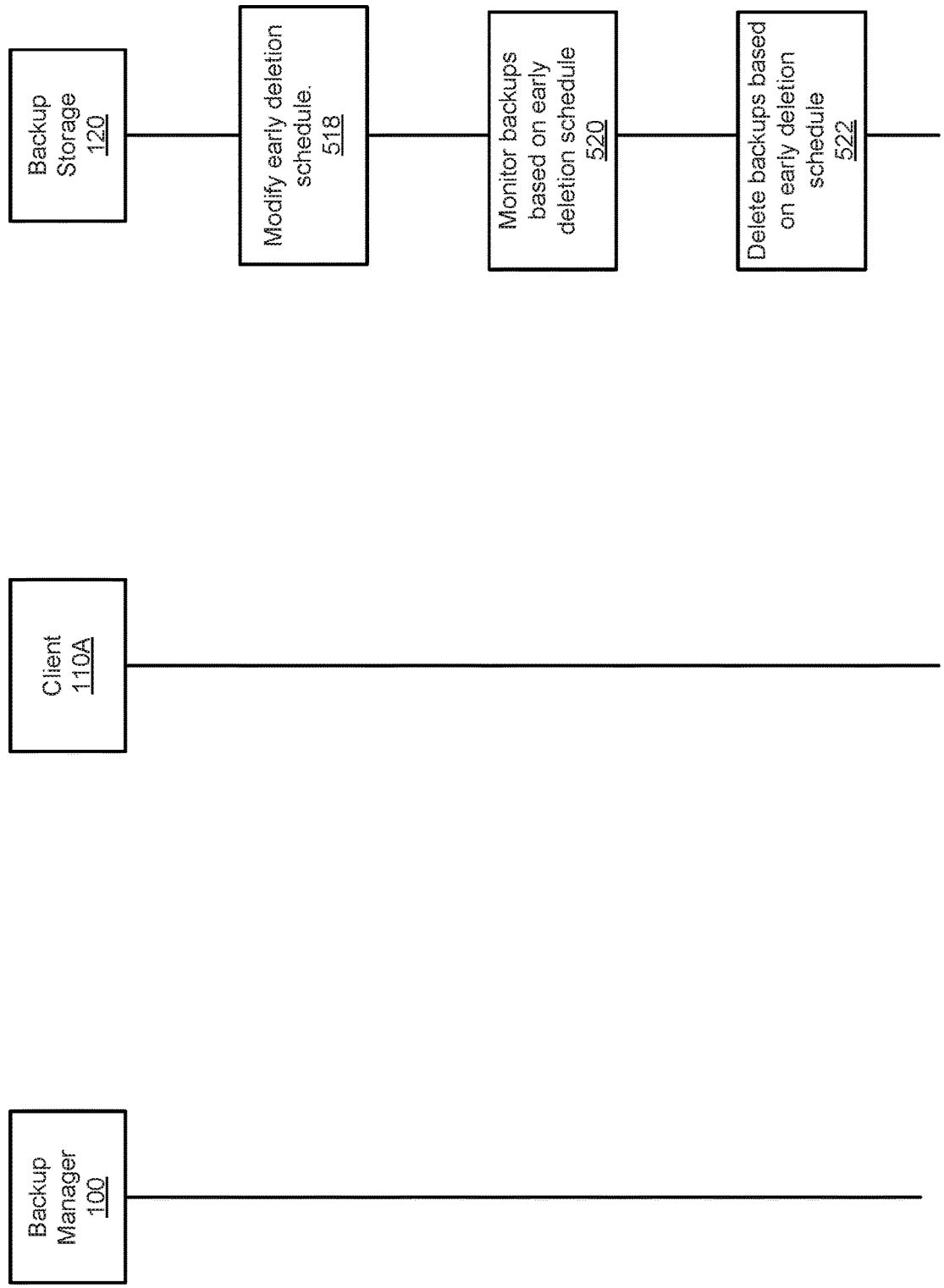
FIG. 5.3

SYSTEM AND METHOD FOR OVERPROTECTION MITIGATION

BACKGROUND

Devices may generate information based on existing information. For example, devices may obtain information and derive information based on the obtained information. To obtain information, devices may be able to communicate with other devices. The communications between the devices may be through any means.

SUMMARY

In one aspect, a backup storage for managing backups of clients in accordance with one or more embodiments of the invention includes persistent storage and a backup analyzer. The persistent storage includes the backups, protection policies, and an early deletion schedule. The backup analyzer obtains a request to analyze a protection policy of the protection policies; in response to obtaining the request: obtains backup data information associated with the protection policy; makes a determination, based on the backup data information and the protection policy, that a portion of the backups associated with the protection policies overprotect a client of the clients associated with the protection policy; and modifies the early deletion schedule based on the determination to obtain a modified early deletion schedule.

In one aspect, a method for managing backups of clients in accordance with one or more embodiments of the invention includes obtaining a request to analyze a protection policy of protection policies; in response to obtaining the request: obtaining backup data information associated with the protection policy; making a determination, based on the backup data information and the protection policy, that a portion of the backups associated with the protection policies overprotect a client of the clients associated with the protection policy; and modifying an early deletion schedule based on the determination to obtain a modified early deletion schedule.

In one aspect, a non-transitory computer readable medium in accordance with one or more embodiments of the invention includes computer readable program code, which when executed by a computer processor enables the computer processor to perform a method for managing backups of clients. The method includes obtaining a request to analyze a protection policy of protection policies; in response to obtaining the request: obtaining backup data information associated with the protection policy; making a determination, based on the backup data information and the protection policy, that a portion of the backups associated with the protection policies overprotect a client of the clients associated with the protection policy; and modifying an early deletion schedule based on the determination to obtain a modified early deletion schedule.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 2.1 shows a diagram of a backup manager in accordance with one or more embodiments of the invention.

FIG. 2.2 shows a diagram of a backup storage in accordance with one or more embodiments of the invention.

FIGS. 5.1-5.3 show an example in accordance with one or more embodiments of the invention.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for reducing the impact of overprotection. Overprotection may refer to the consumption of computing resources in a manner that does not contribute to meeting data protection policies of a distributed system.

A system in accordance with embodiments of the invention may reduce the impact of overprotection by analyze protection policies to determine if overprotection will occur due to workflows employed for generating backups of entities in the distributed system. If the analysis indicates that overprotection is present, the system in accordance with embodiments of the invention may automatically schedule the early deletion of backups that do not contribute to meeting data protection policies but would be retained due to backup generation workflows defined by administrators of the distributed system.

Figure 1:
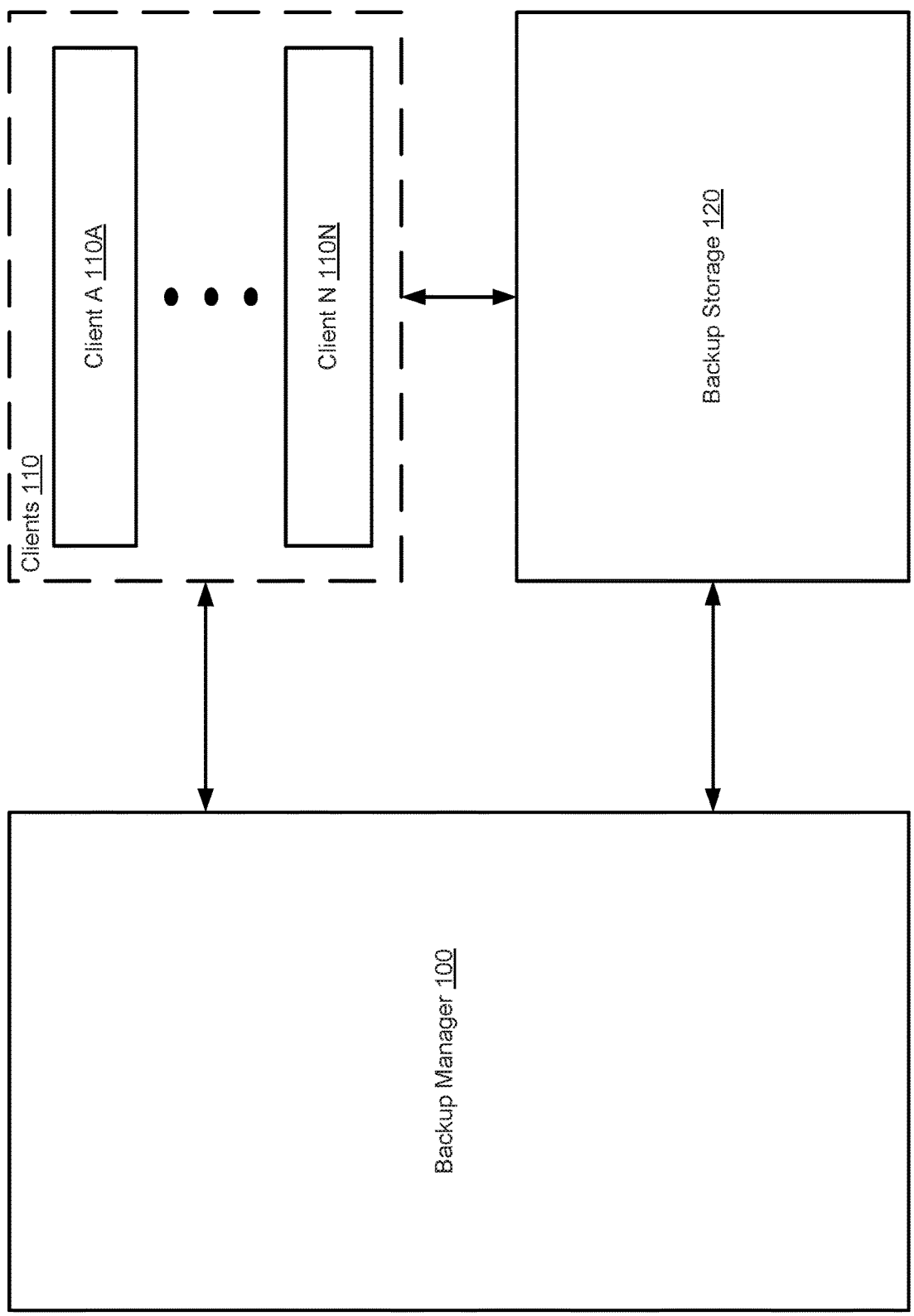
FIG. 1 shows a system in accordance with one or more embodiments of the invention.

FIG. 1 shows a system in accordance with one or more embodiments of the invention. The system may include a backup manager (100) and clients (110). The backup manager (100) may provide backup and/or restoration services to the clients (110). The backup and/or restoration services may include orchestrating the generation and storage of backups in backup storage (120) based on protection policies associated with clients (110).

When providing backup and/or restoration services, the backup manager (100) may do so based on workflows that define when backups are generated. Consequently, any number of backups may be generated for an entity based on the workflow employed by the backup manager (100). The workflow employed by the backup manager may be set by, for example, an administrator.

When backups are stored in the backup storage (120), the backups may consume computing resources of the backup storage (120) upon initial storage and over time during the duration of storage. The duration of storage of the backups in the backup storage (120) may be set based on the workflow employed by the backup manager (100) for providing backup services.

Embodiments of the invention may provide a method for reducing the quantity of storage resources consumed for storing backups in backup storage (120). For example, when backups are stored in backup storage (120), the retention period set at the time of storage may exceed that necessary to meet the scope of protection required to be provided to an entity for which the backups are generated. Consequently, computing resources may be needlessly consumed for storing the backups beyond that required to meet the scope of protection required for a corresponding entity.

To reduce the quantity of computing resources consumed for storing backups, the backup storage (120) may provide overprotection mitigation services and data storage services to the clients (110). The data storage services may include storing data provided by the clients (110). The data stored in backup storage (120) may be used for restoration purposes. The data stored in the backup storage (120) may be used for other purposes without departing from the invention. The overprotection mitigation services may include analyzing protection policies associated with clients and deleting backups, prior to previously scheduled deletion times, based on the analysis of the protection policies. Doing so may free storage resources for other uses that would otherwise be consumed for storing the backups beyond that required to meet the scope of protections specified by the protection policies.

The components of the system illustrated in FIG. 1 may be operably connected to each other and/or operably connected to other entities (not shown) via any combination of wired and/or wireless networks. Each component of the system illustrated in FIG. 1 is discussed below.

The backup manager (100) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 3-4. The backup manager (100) may be implemented using other types of computing devices without departing from the invention. For additional details regarding computing devices, refer to FIG. 6.

The backup manager (100) may be implemented using logical devices without departing from the invention. For example, the backup manager (100) may include virtual machines that utilize computing resources of any number of physical computing devices to provide the functionality of the backup manager (100). The backup manager (100) may be implemented using other types of logical devices without departing from the invention.

In one or more embodiments of the invention, the backup manager (100) provides backup and/or restoration services to the clients (110). The backup and/or restoration services may include (i) initiating the generation of backups associated with clients (110), and (ii) initiating the restoration of clients using previously generated backups. The backup manager (100) may provide other and/or additional services to the clients (110) and/or other entities without departing from the invention. For additional information regarding the backup manager (100), refer to FIG. 2.1.

The clients (110) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 3-4. The clients (110) may be implemented using other types of computing devices without departing from the invention. For additional details regarding computing devices, refer to FIG. 6.

The clients (110) may be implemented using logical devices without departing from the invention. For example, the clients (110) may include virtual machines that utilize computing resources of any number of physical computing devices to provide the functionality of the clients (110). The clients (110) may be implemented using other types of logical devices without departing from the invention.

The clients (110) may generate and store data. The clients (110) may utilize persistent storages to store the data. The data may need extra protection to avoid data loss from persistent storage failure. The data may need extra protection for other reasons without departing from the invention. To protect the client data, the clients (110) may need to store backups of client data in backup storage (120). There may be any number of clients (e.g., 110A, 110N) without departing from the invention.

In one or more embodiments of the invention, the clients (110) provide computer implemented services. A computer implemented service may be, for example, managing a database, serving files, and/or providing other types of services that may be utilized by users. The computing implemented services may be other types of services without departing from the invention.

When providing computer implemented services, the clients (110) may generate and store data which the clients (110) utilize to provide the computer implemented services. For example, to provide database services, the clients (110) may store information from a user in a database. The user may desire access to the information in the future. Consequently, the future availability of the data stored in the database may be valuable to the clients (110).

Similarly, other entities may desire access to all, or a portion, of the data stored in the clients (110) at future points in time. For example, other entities may desire to obtain access to information included in a database hosted by one or more of the clients (110).

To improve the likelihood that such data is available in the future, the clients (110) may utilize backup and/or restoration services provided by the backup manager (100). As discussed above, the backup and/or restoration services provided by the backup manager (100) which may include orchestration of backup generation, storage of backups in the backup storage (120), and/or providing access to backups and/or information included in the backups for restoration purposes.

When utilizing the backup and/or restoration services provided by the backup manager (100), the clients (110) may perform actions under the directions of the backup manager (100). By doing so, the backup manager (100) may orchestrate the transmission of data and/or performance of actions between the clients (110), the backup manager (100), and/or the backup storage (120). For example, a client (e.g., 110A) may send backups to the backup storage (120) under the direction of the backup manager (100).

The backup storage (120) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 3-4. The backup storage (120) may be implemented using other types of computing devices without departing from the invention. For additional details regarding computing devices, refer to FIG. 6.

The backup storage (120) may be implemented using logical devices without departing from the invention. For example, the backup storage (120) may include virtual machines that utilize computing resources of any number of physical computing devices to provide the functionality of the backup storage (120). The backup storage (120) may be implemented using other types of logical devices without departing from the invention.

In one or more embodiments of the invention, the backup storage (120) provide (i) data storage services to the clients (110) (ii) over protection mitigation services. The data storage services may include (i) storing data and providing of previously stored data. The backup storage may provide other and/or additional services without departing from the invention.

The overprotection mitigation services may include (i) analyzing protection policies, (ii) determining if there is overprotection associated with a protection policy, and (iii) deleting backups associated with overprotection. The backup storage (120) may provide other and/or additional services to other and/or addition entities without departing from the invention. For additional information regarding the backup storage (120), refer to FIG. 2.2.

While the system of FIG. 1 has been described and illustrated as including a limited number of components for the sake of brevity, a system in accordance with embodiments of the invention may include additional, fewer, and/or different components than those illustrated in FIG. 1 without departing from the invention.

As discussed above, the backup manager (100) may provide backup and/or restoration services to the clients (110, FIG. 1). FIG. 2.1 shows a diagram of a backup manager (100) in accordance with one or more embodiments of the invention. The backup manager (100) may include a backup orchestrator (200) and persistent storage (210). The backup orchestrator (200) may orchestrate backup generation for clients and restoration of clients using backups. The persistent storage (210) may provide data storage services. Each of these components is discussed below.

As discussed above, the backup orchestrator (200) may orchestrate backup and/or restoration services provided by the backup manager (100). The backup and/or restoration services may be used to store backups in the backup storage (120, FIG. 1) and restore clients (110). The backup and/or restoration services may include (i) initiating generation of backups based on workflows specified by administrators, (ii) maintaining a backup data repository, (iii) maintaining a backup generation schedule (e.g., workflows specified by administrators), (iv) initiating storage of backups in the backup storage (120), (v) sending protection policy analysis requests to the backup storage (120), (vi) sending copies of protection policies to the backup storage, (vii) monitoring clients (110) for failure, and (viii) initiating restoration of failed clients (e.g., 110). The backup orchestrator (200) may provide other and/or additional services to other and/or additional entities without departing from the invention.

The backup orchestrator (200) may be implemented using a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup orchestrator (200) described throughout this application and/or all or a portion of the methods illustrated in FIGS. 3-4. The backup orchestrator (200) may be some other physical device without departing from the invention.

Figure 3:
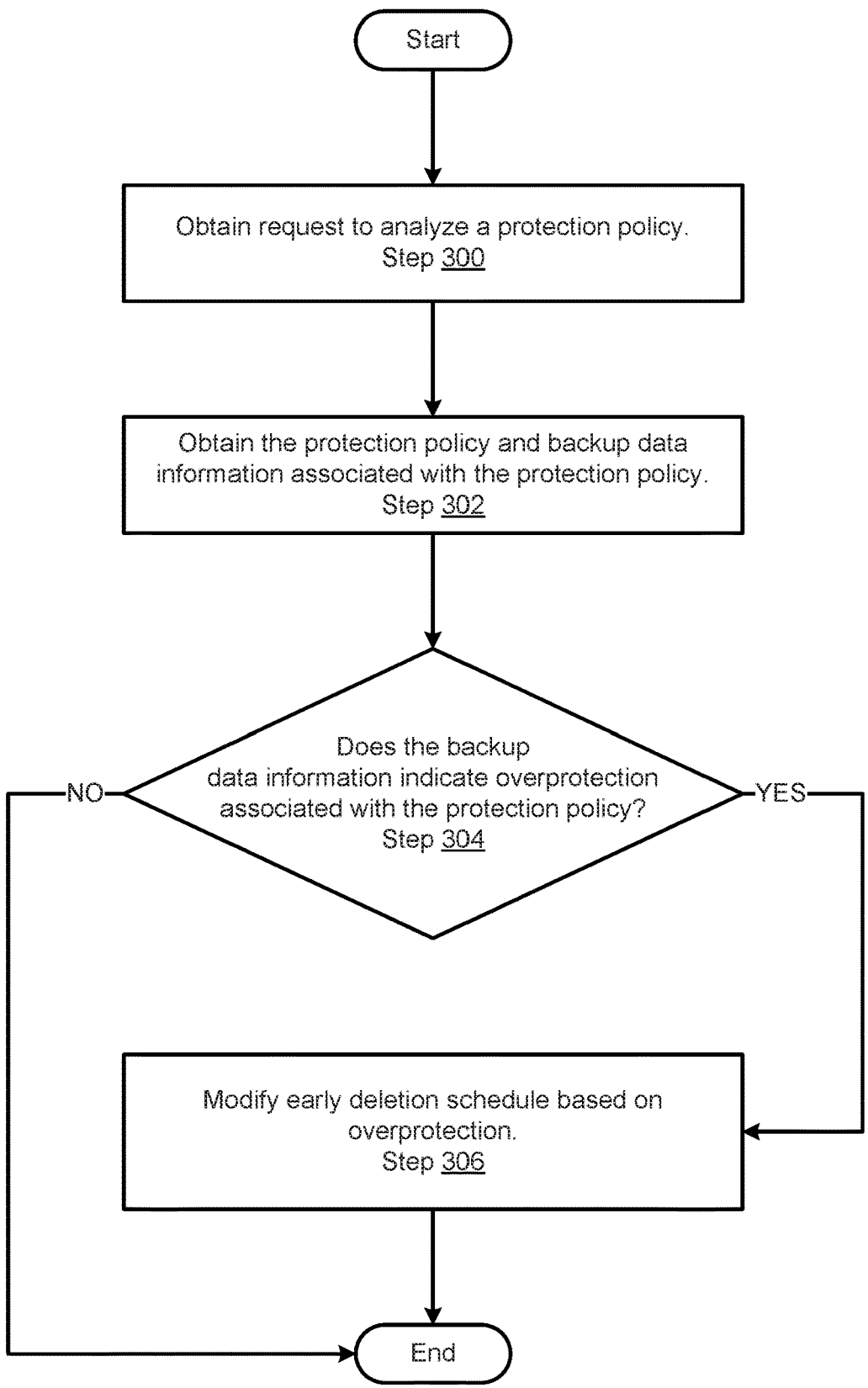
FIG. 3 shows a flowchart of a method in accordance with one or more embodiments of the invention.
Figure 4:
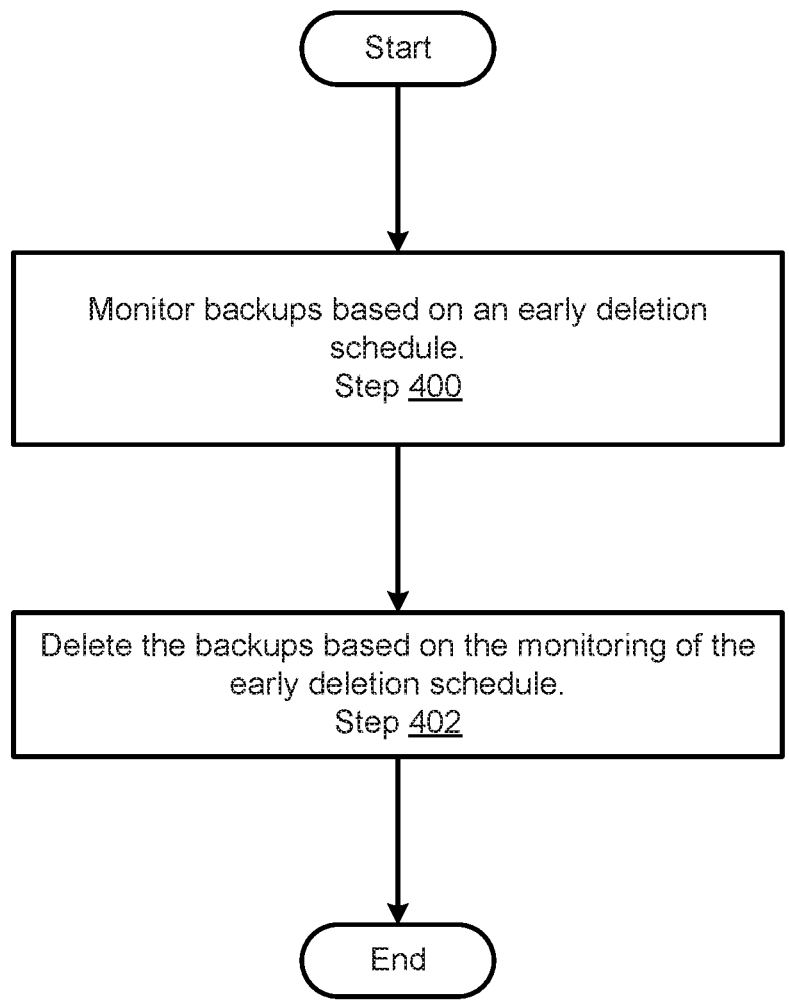
FIG. 4 shows a flowchart of a method in accordance with one or more embodiments of the invention.

The backup orchestrator (200) may be implemented using computer instructions (e.g., computing code) stored on a persistent storage (e.g., 210) that when executed by a processor of the backup manager (100) causes the backup manager (100) to perform the functionality of the backup orchestrator (200) described throughout this application and/or all or a portion of the methods illustrated in FIGS. 3-4.

The backup orchestrator (200) may utilize data structures stored in a persistent storage (210) of the backup manager (100).

The persistent storage (210) may be implemented using physical storage devices and/or logical storage devices. The physical storage devices may include any combination of hard disk drives, solid state disk drives, tape drives, and/or any other physical storage mediums for the storage of data.

Logical storage devices (e.g., virtualized storage) may utilize any quantity of hardware storage resources of any number of computing devices for storing data. For example, the persistent storage (210) may utilize portions of any combination of hard disk drives, solid state disk drives, tape drives, and/or any other physical storage medium of any number of computing devices.

As discussed above, the persistent storage (210) may store data structures utilized by the backup orchestrator (200). The data structures stored in persistent storage (210) may include a backup data repository (212), protection policies (214), and a backup generation schedule (216). Each of these data structures is discussed below. The persistent storage (210) may store other and/or addition data structures without departing from the invention.

The backup data repository (212) may include data structures that include information about the backups generated by the clients (110, FIG. 1) and stored in the backup storage (120, FIG. 1). The information included in the backup data repository (212) pertaining to the backups in the backup storage (120, FIG. 1) may include backup identifiers, backup types, creation times, backup sizes, retention periods, and storage locations. Each of these types of information is discussed below. The information stored in the backup data repository (212) may be maintained and updated by the backup orchestrator (200). The backup data repository (212) may include other information pertaining to backups stored in the backup storage (120, FIG. 1) without departing from the invention.

Backup identifiers may be used by the backup analyzer to differentiate the backups stored in backup storage (120, FIG. 1). The backup identifiers may be reference numbers or any other identifier that differentiates backups in backup storage (120, FIG. 1) without departing from the invention.

Backup types may include information that specifies the type of backup a backup stored in the backup storage (120, FIG. 1) is. Backups stored in the backup storage (120, FIG. 1) may be, for example, full backups, differential backups, incremental backups, or application specific backups. Backups stored in backup storage (120, FIG. 1) may be any type of backup without departing from the invention.

Creation times may include information that specifies the time in which a backup stored in the backup storage (120, FIG. 1) was generated. The creation time may include the second, minute, hour, day, month, and/or year that a backup stored in the backup storage (120, FIG. 1) was generated. The creation time may include other references of time that may be used to discern when a backup of the backup storage (120, FIG. 1) was created without departing from the invention.

Backup sizes may include information that specifies the size of a backup stored in the backup storage (120). For example, the backup sizes may specify the size of a backup in megabytes, gigabytes, or any other unit of storage size. The backup sizes may include other and/or additional information regarding the size of backups stored in backup storage (120, FIG. 1) without departing from the invention.

The retention period may include information that specifies the amount of time a backup stored in the backup storage (120, FIG. 1) must remain stored before the backups can be overwritten, edited, and/or deleted from the backup storage (120, FIG. 1). The retention period may include the second, minute, hour, day, month, and/or year when a backup may be overwritten, edited, and/or deleted. The retention period may include other and/or additional information pertaining to the retention period of backups without departing from the invention.

The storage location may include information that specifies the storage location of a backup stored in backup storage (120, FIG. 1). The backup storage (120, FIG. 1) may include any number of storage devices. The storage location may specify the storage device that a backup is stored in. The storage location may be, for example, a storage device reference number that specifies the storage device a backup is stored in. The storage location may include other and/or additional information pertaining to the storage location of backups stored in the backup storage (120, FIG. 1) without departing from the invention.

Protection policies (214) may be data structures that include various requirements for storing backups for client applications. In other words, the protection policies (214) may define the scope of protection to be provided to any number of entities for which backup services are provided.

For example, the protection policies may specify the retention period, number of copies of a backup to be maintained, minimum accessibility for stored backups, and/or other characteristics that define, at least, for how long each backup should be stored in backup storage to meet the scope of protection defined by the data protection policy associated with a respective entity. There may be any number of protection policies (214) stored in the persistent storage (210). There may be any number of requirements associated with a protection policy of protection policies (214). The protection policies (214) may be utilized by the backup orchestrator (200) to initiate backups of client data. The protection policies may be used by the backup storage (120, FIG. 1) to monitor overprotection.

The backup generation schedule (216) may be data structures that include information regarding the scheduling of backup generations. The backup generation schedule (216) may establish time frames for backup generation. The backup generation schedule may include information regarding when to generate backups for clients (110, FIG. 1) associated with protection policies (214). The backup generation schedule may be utilized by the backup orchestrator (200) to generate backups. The backup generation schedule (216) may be specified by, for example, an administrator or other user of the system of FIG. 1.

While the backup manager (100) has been illustrated as including a limited number of specific components, a backup manager in accordance with embodiments of the invention may include additional, fewer, and/or different components without departing from the invention.

As discussed above, the backup storage (120) may provide data storage services and overprotection mitigation services to the clients. FIG. 2.2 shows a diagram of a backup storage (120) in accordance with one or more embodiments of the invention. The backup storage (120) may include several components, a backup analyzer (220) and persistent storage (230). The backup analyzer (220) may provide the overprotection mitigation services of the backup storage (120) to the clients (110). The persistent storage (230) may provide the data storage services of the backup storage (120) to the clients (110). Each of these components is discussed below.

As discussed above, the backup analyzer (220) may provide the overprotection mitigation services of the backup storage (120) to the clients (110). The overprotection mitigation services may include (i) obtaining a request to analyze a protection policy, (ii) obtaining the protection policy and backup data information associated with the protection policy, (iii) determining whether the backup data information indicates overprotection associated with the protection policy, (iv) modifying early deletion schedule based on overprotection, (v) monitoring backups based on the early deletion schedule, and (vi) deleting backups based on the monitoring of the early deletion schedule. The backup analyzer (220) may provide other and/or additional services to other and/or additional entities without departing from the invention.

The backup analyzer (220) may be implemented using a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup analyzer (220) described throughout this application and/or all or a portion of the methods illustrated in FIGS. 3-4. The backup analyzer (220) may be some other physical device without departing from the invention.

The backup analyzer (220) may be implemented using computer instructions (e.g., computing code) stored on a persistent storage (e.g., 230) that when executed by a processor of the backup storage (120) causes the backup storage (120) to perform the functionality of the backup analyzer (220) described throughout this application and/or all or a portion of the methods illustrated in FIGS. 3-4.

The backup analyzer (220) may utilize data structures stored in a persistent storage (230) of the backup storage (120).

The persistent storage (230) may be implemented using physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilizes any quantity of hardware storage resources of any number of computing devices for storing data. For example, the persistent storage (230) may utilize portions of any combination of hard disk drives, solid state disk drives, tape drives, and/or any other physical storage medium of any number of computing devices.

As discussed above, the persistent storage (230) may store data structures utilized by the backup analyzer (220). The data structures stored in persistent storage (210) may include a backup repository (232), protection policies (214), and an early deletion schedule (234). Each of these data structures is discussed below. The persistent storage (230) may store other and/or addition data structures without departing from the invention.

The backup repository (232) may be data structures that include one or more of the backups generated by clients (110) and stored in the backup storage (120) for restoration purposes. Backups may be stored in the backup repository (232) for other purposes without departing from the invention. The backup repository (232) may include any quantity of backups. The backup repository (232) may include any type of backup. The backup repository (232) may include other and/or addition information without departing from the invention.

The protection policies (214) may be data structures that include various requirements for storing backups for client applications, as described with respect to FIG. 2.1. In FIG. 2.2, the protection policies (214) are illustrated using a box having a dashed outline to indicate that the protection policies (214) may be stored in other locations (e.g., storage of the backup manager) without departing from the invention.

The early deletion schedule (234) may be a data structure that includes information pertaining to the early deletion of backups that are associated with overprotection of protection policies (214). The early deletion schedule (234) may include backup identifiers to differentiate the backups stored in the backup storage (120). The early deletion schedule (234) may also include the minimum retention periods of backups, and/or portions of backups, that have an actual retention period that is longer than the minimum retention period for said backups as determined by the backup analyzer (220). The early deletion schedule (234) may be used by the backup analyzer (220) to delete backups in the backup storage (120) associated with overprotection.

As discussed above, a backup storage in accordance with one or more embodiments of the invention may analyze protection policies to determine whether there is overprotection associated with the protection policies and delete backups stored in the backup storage that are associated with overprotection. FIGS. 3-4 show methods that may be performed by the backup storage when providing the aforementioned functionality.

FIG. 3 shows a flowchart of a method in accordance with one or more embodiments of the invention. The method depicted in FIG. 3 may be used to determine whether there is overprotection associated with a protection policy. The method depicted in FIG. 3 may be performed by, for example, the backup storage (120, FIG. 1). Other components of the system illustrated in FIG. 1 may perform all, or a portion, of the method of FIG. 3 without departing from the invention.

While FIG. 3 is illustrated as a series of steps, any of the steps may be omitted, performed in a different order, additional steps may be included, and/or any or all of the steps may be performed in a parallel and/or partially overlapping manner without departing from the invention.

In step 300, a request to analyze a protection policy is obtained.

The backup manager may periodically request the backup storage to analyze protection policies. The backup manager may send a message to the backup storage. The message may include a request to analyze a protection policy of protection policies. A request to analyze a protection policy may be obtained via other and/or additional methods without departing from the invention.

In step 302, the protection policy and backup data information associated with the protection policy are obtained.

After obtaining the request to analyze a protection policy, the backup storage may obtain both the protection policy to be analyzed and the backup data information associated with the protection policy.

The backup storage may send a message to the backup manager. The message may include a request for the protection policy to be analyzed by the backup storage. In response the request for the protection policy, the backup orchestrator of the backup manager may obtain the protection policy from persistent storage of the backup manager and send a message to the backup storage that includes the protection policy. The protection policy may be obtained via other and/or additional methods without departing from the invention.

The backup storage may send another message to the backup manager. The message may request backup data information associated with the protection policy. In response to the request, the backup orchestrator may identify and obtain all the backup data information of backups associated with the protection policy from the backup data repository stored in the persistent storage of the backup manager. The backup orchestrator may send a message to the backup storage that includes all of the backup data information of all the backups that are associated with the protection policy. The backup data information may be obtained via other and/or additional information without departing from the invention.

After obtaining the protection policy to be analyzed from the backup manager, the backup storage may obtain the backup data information from the backup repository stored in the persistent storage of the backup storage. The backup analyzer of the backup storage may access the backup repository and identify all of the backups associated with the obtained protection policy. The backup analyzer may analyze the backups associated with the protection policy to obtain the backup data information of all the backups associated with the protection policy. The backup data information may be obtained via other and/or additional methods without departing from the invention.

In step 304, it is determined whether the backup data information indicates overprotection associated with the protection policy.

The backup analyzer of the backup storage may compare the obtained backup data information with the obtained protection policy. The backup data information may indicate there is overprotection associated with the protection policy. Based on this comparison, the backup analyzer may determine that the backup data information indicates overprotection associated with the client. It may be determined whether the backup data information indicates overprotection associated with the protection policy via other and/or additional methods without departing from the invention.

For example, a protection policy may require that backups of data from a particular application of a client be able to restore the client for 3 months after the first backup of the application data was generated. The backup data information may include that several backups of application have actual retention periods that are longer than the 3 months required by the protection policy. The backup analyzer may compare the protection policy with the backup data information and determine that overprotection associated with the protection policy is indicated due to the retention periods of several backups of application data that are longer than the 3 months after the first backup as required by the protection policy.

If it is determined the backup data information indicates overprotection associated with the protection policy, the method may proceed to step 306. If it is determined the backup data information does not indicate overprotection associated with the protection policy, the method may end following step 304.

In step 306, the early deletion schedule is modified based on overprotection.

Based the determination that overprotection is associated with a protection policy, the early deletion schedule may be modified by the backup analyzer. The backup analyzer of the backup storage may include the backup identifiers of the backups associated with the overprotection of the protection policy and the minimum retention period of the backups associated with the overprotection of the protection policy when modifying the early deletion schedule. The early deletion schedule may be modified by the backup analyzer writing the aforementioned information into a data structure of the early deletion schedule stored in the persistent storage of the backup storage. The early deletion schedule may be modified based on overprotection via other and/or additional methods without departing from the invention.

The method may end following step 306.

In one or more embodiments of the invention, a protection policy is analyzed to determine whether overprotection is associated with the protection policy via the method illustrated in FIG. 3. Other and/or additional methods may be used to analyze a protection policy to determine whether overprotection is associated with the protection policy without departing from the invention.

As discussed above, the backup storage may delete backups that are associated with overprotection. FIG. 4 shows a flowchart of a method in accordance with one or more embodiments of the invention. The method depicted in FIG. 4 may be used to delete backups that are associated with overprotection. The method depicted in FIG. 4 may be performed by, for example, the backup storage (120, FIG. 1). Other components of the system illustrated in FIG. 1 may perform all, or a portion, of the method of FIG. 4 without departing from the invention.

While FIG. 4 is illustrated as a series of steps, any of the steps may be omitted, performed in a different order, additional steps may be included, and/or any or all of the steps may be performed in a parallel and/or partially overlapping manner without departing from the invention.

In step 400, backups are monitored based on the early deletion schedule.

The backup analyzer of the backup storage may periodically access the early deletion schedule and obtain the backup identifier and minimum retention period of backups stored in the backup storage that are associated with overprotection. The backup analyzer may identify those backups in the backup repository of the backup storage based on their backup identifiers. The backup analyzer may continue to check the early deletion schedule to identify other/and or new backups that are associated with overprotection of protection policies. Backups may be monitored via other and/or additional methods without departing from the invention.

In step 402, backups are deleted based on the monitoring of the early deletion schedule.

As discussed above, the backup analyzer may use the early deletion schedule to identify backups associated with overprotection of protection policies. The backup analyzer may wait until the minimum retention periods of the identified backups stored in the early deletion schedule end. When the minimum retention periods of the identified backups end, the backup analyzer may delete the identified backups from the backup storage. The backup analyzer may repeat this method for all backups associated with overprotection. Backups may be deleted based on the monitoring of the early deletion schedule via other and/or additional methods without departing from the invention.

The method may end following step 402.

In one or more embodiments of the invention, backups associated with overprotection may be deleted via the method illustrated in FIG. 4. Other and/or additional methods may be used to delete backups associated with overprotection without departing from the invention.

To further clarify aspects of the invention, a non-limiting example is provided in FIGS. 5.1-5.3. FIG. 5.1 shows a diagram of an example system and FIGS. 5.2-5.3 show diagrams of actions that may be performed by the example system depicted in FIG. 5.1. The system of FIG. 5.1 may be similar to that of FIG. 1. For the sake of brevity, only a limited number of components of the system of FIG. 1 are illustrated in FIG. 5.1.

Example

Consider a scenario as illustrated in FIG. 5.1 in which a backup storage (120) is providing overprotection mitigation services to a client (110A). The backup storage may obtain a protection policy and backup information from a backup manager (100) and analyze the protection policy to determine if there is overprotection associated with the protection policy.

Turning to FIGS. 5.2-5.3, the aforementioned figures illustrate interactions and actions between components of the system of FIG. 5A. In these figures, the relative occurrence in time of the interactions progresses from the top of each figure (i.e., earlier in time) to the bottom of each figure (i.e., later in time). FIG. 5.3 is a continuation of the diagram of FIG. 5.2. In other words, element 500 indicates the first interaction that occurs in time while element 522 indicates the last interaction that occurs.

At a first point in time, the backup manager (100) sends a message to the client (110A) that includes a backup generation request (500). In response to the backup generation request (500) from the backup manager (100), the client (110A) generates a backup (502). After generating the backup (502), the client sends the backup (504) to the backup storage (120). Upon receiving the backup (504) from the client (110A), the backup storage (120) stores the backup (506).

After the backup is stored (506), the backup manager sends a message to the backup storage (120) that includes a protection policy analysis request (508). After obtaining the protection policy analysis request (508) from the backup manager (100), the backup storage (120) sends a message to the backup manager (100) that includes a protection policy request (510).

In response to receiving the protection policy request (510) from the backup storage (120), the backup manager (100) sends the protection policy (512) to be analyzed to the backup storage (120).

After obtaining the protection policy (512) from the backup manager (100), the backup storage obtains backup data information (514) of backups associated with the protection policy (512) that are stored in the backup storage (120). Once the backup data information (514) is obtained, the backup storage analyzes the protection policy (512) by comparing the backup data information with the protection policy (516) to determine if there is overprotection associated with the protection policy.

In this example, the backup data information indicates that the backup should be retained for 2 years. However, the protection policy (516) indicates that the backup need only be retained for 3 months to meet the scope of protection defined by the protection policy (516).

Turning to FIG. 5.3, the backup storage (120) modifies the early deletion schedule (518) based on overprotection associated with the protection policy. Specifically, the early deletion schedule is modified to cause the backup to be deleted in 3 months, 21 months earlier than it would have been deleted had the early deletion schedule not been modified.

After the backup storage (120) modifies the early deletion schedule, the backup storage (120) monitors backups stored in the backup storage (120) based on the early deletion schedule (520).

After 3 months of monitoring, the backup storage (120) deletes backups based on the modified early deletion schedule (522).

End of Example

Figure 6:
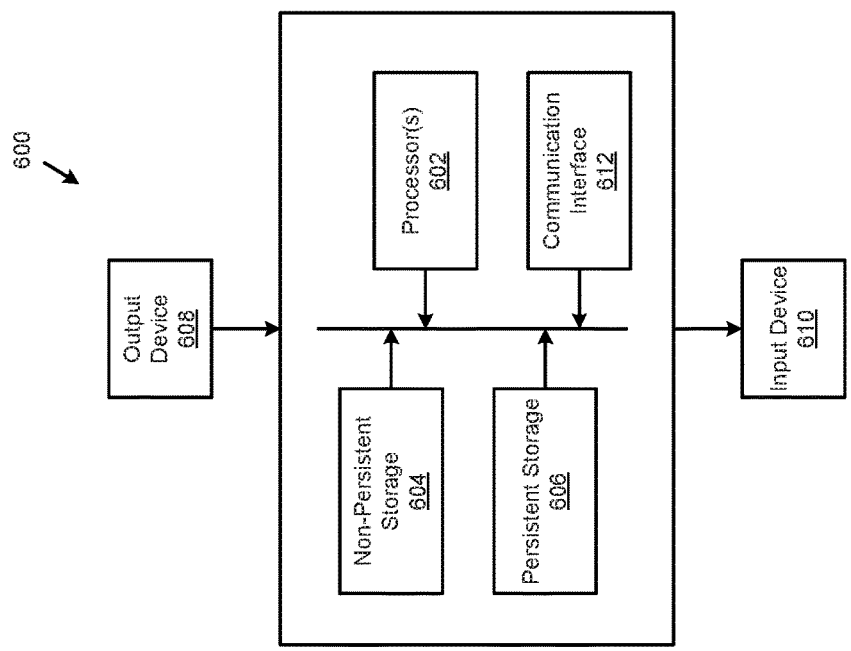
FIG. 6 shows a diagram of a computing device in accordance with one or more embodiments of the invention.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

Embodiments of the invention may provide a method for reducing the computing resource cost required to meet protection policies. The method may analyze stored backups in view of protection policies to identify whether the backups are scheduled to be retained for a duration of time that is longer than required to meet the protection policies. For backups that are scheduled to be retained for a duration of time that is longer than required to meet the protection policies, a system in accordance with embodiments of the invention automatically schedules and executes early deletion of the backups. By doing so, workflows for providing backups services that would result in the needless storing of backups beyond that required to meet protection policy requirements may be mitigated.

Thus, embodiments of the invention may address the problem of limited computational resource availability for providing backup services in a distributed environment by preferentially deleting backups that are not necessary to meet data protection policies. By doing so, expenditures of computing resources for backup storage purposes that do not contribute to meeting protection policies may be avoided.

Additional embodiments of the invention may reduce a cognitive burden on an administrator. Due to the increasing large number of entities for which backup services are provided, it may be cognitively difficult to set corresponding workflows for generating backups that meet corresponding protection policies. Embodiments of the invention may automatically remediate backup generation workflows that would needlessly consume computing resources of a system without contributing to meeting data protection goals. By doing so, administrators may set backup generation workflows on a macro level without needing to granularly determine whether the set workflows efficiently utilize the limited computing resources of a distributed system.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A backup storage for managing backups of clients, comprising:
 persistent storage for storing:
  the backups,
  protection policies, and
  an early deletion schedule; and
 a backup analyzer programmed to:
  obtain a request to analyze a protection policy of the protection policies;
  in response to obtaining the request:
   obtain backup data information associated with the protection policy;
   make a determination, based on the backup data information and the protection policy, that a portion of the backups associated with the protection policies overprotect a client of the clients associated with the protection policy; and
   modify the early deletion schedule based on the determination to obtain a modified early deletion schedule.

2. The backup storage of claim 1, wherein the backup analyzer is further programmed to:
 after obtaining the modified early deletion schedule:
  monitor the backups based on the early deletion schedule; and
  delete, based on the monitoring, at least one of the backups earlier than an end of a retention time for the at least one of the backups.

3. The backup storage of claim 1, wherein the portion of the backups comprises:
 a first backup that includes data associated with all data of the client;
 a second backup that includes second data only associated with application data of an application hosted by the client.

4. The backup storage of claim 3, wherein the first backup has a first retention time, wherein the second backup has a second retention time, wherein the second retention time is longer than the first retention time.

5. The backup storage of claim 1, wherein the protection policy specifies, at least in part, a minimum duration of time during which the portion of the backups are usable for restoring the client.

6. The backup storage of claim 5, wherein the backup data information specifies an actual duration of time during the portion of the backups are usable for restoring the client, wherein the actual duration of time is longer than the minimum duration of time.

7. The backup storage of claim 6, wherein modifying the early deletion schedule comprises:
 scheduling deletion of at least one backup of the portion of the backups to reduce the actual duration of time to the minimum duration of time.

8. A method for managing backups of clients, comprising:
 obtaining a request to analyze a protection policy of protection policies;
 in response to obtaining the request:
  obtaining backup data information associated with the protection policy;
  making a determination, based on the backup data information and the protection policy, that a portion of the backups associated with the protection policies overprotect a client of the clients associated with the protection policy; and
  modifying an early deletion schedule based on the determination to obtain a modified early deletion schedule.

9. The method of claim 8, further comprising:
 after obtaining the modified early deletion schedule:
  monitoring the backups based on the early deletion schedule; and
  deleting, based on the monitoring, at least one of the backups earlier than an end of a retention time for the at least one of the backups.

10. The method of claim 8, wherein the portion of the backups comprises:
 a first backup that includes data associated with all data of the client;
 a second backup that includes second data only associated with application data of an application hosted by the client.

11. The method of claim 10, wherein the first backup has a first retention time, wherein the second backup has a second retention time, wherein the second retention time is longer than the first retention time.

12. The method of claim 8, wherein the protection policy specifies, at least in part, a minimum duration of time during which the portion of the backups are usable for restoring the client.

13. The method of claim 12, wherein the backup data information specifies an actual duration of time during the portion of the backups are usable for restoring the client, wherein the actual duration of time is longer than the minimum duration of time.

14. The method of claim 13, wherein modifying the early deletion schedule comprises:
 scheduling deletion of at least one backup of the portion of the backups to reduce the actual duration of time to the minimum duration of time.

15. A non-transitory computer readable medium comprising computer readable program code, which when executed by a computer processor enables the computer processor to perform a method for managing backups of clients, the method comprising:
 obtaining a request to analyze a protection policy of protection policies;
 in response to obtaining the request:
  obtaining backup data information associated with the protection policy;
  making a determination, based on the backup data information and the protection policy, that a portion of the backups associated with the protection policies overprotect a client of the clients associated with the protection policy; and
  modifying an early deletion schedule based on the determination to obtain a modified early deletion schedule.

16. The non-transitory computer readable medium of claim 15, wherein the method further comprises:
 after obtaining the modified early deletion schedule:
  monitoring the backups based on the early deletion schedule; and
  deleting, based on the monitoring, at least one of the backups earlier than an end of a retention time for the at least one of the backups.

17. The non-transitory computer readable medium of claim 15, wherein the portion of the backups comprises:

a first backup that includes data associated with all data of the client;

a second backup that includes second data only associated with application data of an application hosted by the client.

18. The non-transitory computer readable medium of claim 17, wherein the first backup has a first retention time, wherein the second backup has a second retention time, wherein the second retention time is longer than the first retention time.

19. The non-transitory computer readable medium of claim 15, wherein the protection policy specifies, at least in part, a minimum duration of time during which the portion of the backups are usable for restoring the client.

20. The non-transitory computer readable medium of claim 19, wherein the backup data information specifies an actual duration of time during the portion of the backups are usable for restoring the client, wherein the actual duration of time is longer than the minimum duration of time.

* * * * *